Patented Apr. 11, 1950

2,503,624

UNITED STATES PATENT OFFICE 2,503,624

DEXTRAN BASE WRINKLE DRYING COMPOSITIONS

Enrique L. Luaces, Oakwood, Ohio, assignor to New Wrinkle Inc., Wilmington, Del., a corporation of Delaware No Drawing. Original application February 8, 1946, Serial No. 646,507. Divided and this application May 20, 1949, Serial No. 94,505

2 Claims. (Cl. 106—215)

This invention relates to coating composition, and more particularly deals with coating compositions adapted to dry to a wrinkle.

This application is a division of Enrique L. Luaces application, Serial No. 646,507, filed February 8, 1946, entitled "Dextran base wrinkle drying compositions."

Generally speaking, wrinkle drying coating compositions are divided into two types: the varnish type and the alkyd type.

Varnish type wrinkle drying coating compositions consist essentially of a varnish base including a wrinkling oil in admixture with drier and solvent; while alkyd base wrinkle drying coating compositions consist essentially of an alkyd resin in admixture with drier and a solvent.

The production of both varnish base and alkyd base wrinkle drying coating compositions requires the use of cooking facilities; however, recent developments have brought about a new type of wrinkle drying coating composition in the production of which the cooking step is eliminated. In other words, such coating compositions are prepared by compounding the component parts thereof without the necessity of cooking.

The present invention deals with a wrinkle drying coating composition which falls within the latter category. According to the present invention a wrinkling oil (that is to say, an oil which includes conjugated double bonds in its chemical structure) is admixed with a solution of a dextran derivative such as dextran benzyl ether or dextran acetate in a ratio of from 10 to 50 parts of dextran derivative to each 100 parts of wrinkling oil.

To the resulting mixture may be added, if so desired, from 40 to 80% of a pigment paste comprising, for example ⅔ pigment and ⅓ wrinkling oil by weight. This pigment paste is thoroughly blended into the mixture of dextran derivative and wrinkling oil to produce a homogenous composition.

To this homogenous composition is added a quantity of thinner such as naphtha, toluol, xylol, or mixtures thereof, or any other solvent or mixture of solvents such as customarily employed in varnish formulations, in quantities sufficient to produce a coating of the desired viscosity.

For example, a coating of suitable viscosity for application by spreading, as with a doctor blade, may consist of 40 parts by weight of dextran benzyl ether, 100 parts by weight of wrinkling oil, 60 parts by weight of pigment paste, and 10 parts by weight of naphtha.

The use of dextran derivatives in admixture with wrinkling oils for producing wrinkle drying coating compositions is new in the art; in fact, it has been hitherto considered impossible to use derivatives of dextran in wrinkle drying coating compositions of any sort because such derivatives were considered as inhibitors of wrinkle formation.

The texture of the wrinkle pattern obtained according to the present invention may be controlled or altered by selection of the type of dextran derivative used. In addition, wrinkle patterns and textures hitherto unobtainable may be produced by the simple expedient of varying the amount of dextran derivative employed in the formulation. In addition, this new type of wrinkle drying coating composition including dextran derivative responds to temperature variations during the initial drying or texturing period to such an extent that great variety of textures or patterns may be obtained.

It is believed that the underlying theory concerning the production of wrinkle drying coating composition including derivatives of dextran is as follows:

The mixture of dextran derivatives and wrinkling oil consists of two components which are compatible with each other; however, during the drying or film-forming period these ingredients separate into two distinct phases, and thereby the texture of the wrinkle pattern is altered depending on the relative proportion or ratio of the two component parts. It will be understood, of course, that this theory is offered merely in explanation of observed facts, and that it is not intended thereby to limit this invention.

Dextran is a polysaccharide produced by the action of micro-organisms on a suitable culture medium.

As a specific example, a culture medium containing sucrose in the form of either refined or crude sugar, molasses or the like, together with nitrogen in the form of commercial peptone, beef extract or other similar material, and salts such as dipotassium phosphate and sodium chloride is inoculated with *Leuconostoc mesenteroides* or *Leuconostoc dextranicum*. A typical medium may contain 5 to 10% of sucrose, 0.1% of peptone, 0.2% of dipotassium phosphate and 0.1% of sodium chloride. The pH of the medium is adjusted preferably slightly on the alkaline side of neutrality.

The inoculated culture may be incubated at a temperature most favorable to the growth of the micro-organism being used. For *L. mes-*

*enteroides* a temperature of about 25° C. is suitable. When the fermentation has been completed the polysaccharide formed is precipitated from the culture by the addition thereto of alcohol or acetone. The precipitate may be purified by further washing with alcohol or acetone.

Ethers and esters of dextran are prepared either from the precipitated polysaccharide or from the fermented culture. For example, alkyl or aralkyl derivatives may be prepared by reacting either with alkyl or aralkyl halide in the presence of sodium hydroxide in the ratio of 1 mole of polysaccharide to 3.5 mols of the halide and 4.5 mols of hydroxide.

The method of making ether alkylations comprises the introduction of an alkyl radical by substitution or addition. For this purpose there may be employed any of the large number of compounds including alkyl radicals such as methyl, ethyl, propyl, butyl, amyl and hexyl. The aralkyl or benzyl radical as well as the unsaturated allyl group may be introduced.

Organic halides of the aliphatic series such as methyl chloride, ethyl chloride, propyl or isopropyl chloride, butyl chloride or any of its isomers or any member of the aralkyl series such as benzyl chloride, may be employed.

The following derivatives of dextran have been used successfully in the practice of the the present invention: dextran benzyl ether, dextran butyl ether, dextran betahydroxy ethyl ether, dextran ethyl ether, mixed dextran benzyl and butyl ethers, mixed dextran betahydroxy ethyl and benzyl ethers, dextran acetate.

Any of these derivatives of dextran may be employed in ratios of 10 to 50 parts thereof to each 100 parts of wrinkling oil. The dextran products are employed preferably in solution of a solvent therefor which is compatible with the solvent diluent to be added ultimately to the coating composition which results from the mixing of the dextran derivatives with the wrinkling oil.

As has been noted hereinbefore, wrinkling oils are oils which include conjugated double bonds in their chemical structure. They may be native oils such as tung oil and oiticica oil, or they may be modified oils such as dehydrated castor oil (either blown or unblown), blown linseed oil and alkali isomerized oils prepared from normally non-drying oils such as peanut oil and cottonseed oil, or they may be any other type of fatty oil which includes conjugated double bonds in its chemical structure either in the native state or after treatment causing conjungation of isolated double bonds.

Wrinkle drying coating compositions made according to the method of this invention have been successfully applied on paper, fabric, and other similar flexible materials with great success. The composition has been applied by spraying, spreading, and rolling, and the resulting film has been dried at 130° F. for an initial period of 30 minutes and thereafter for an additional period of from 30 to 60 minutes at 180° F. using a gas fired oven. The drying time may be reduced to from 20 to 30 minutes or less by the use of infrared equipment.

It will be understood that while there have been given herein certain specific examples of the practice of this invention, it is not intended thereby to have this invention limited to or circumscribed by the specific details of materials, proportions, or conditions herein specified, in view of the fact that this invention may be modified according to individual preference or conditions without necessarily departing from the spirit of this disclosure and the scope of the appended claims.

I claim:

1. As a new composition of matter, a wrinkle drying coating composition consisting of a wrinkling oil and dextran acetate admixed at room temperature in proportions of 100 parts by weight of wrinkling oil and from 10 to 50 parts by weight of dextran acetate.

2. The method of making a wrinkle drying coating composition which comprises admixing a wrinkling oil with dextran acetate in proportions of from 10 to 50 parts by weight of dextran acetate to each 100 parts by weight of wrinkling oil, adding thereto approximately 50 to 80 parts by weight of pigment paste consisting of ⅔ pigment and ⅓ wrinkling oil by weight, and adding to the resulting mixture a thinner, the entire process being carried out at room temperature.

ENRIQUE L. LUACES.

No references cited.